May 9, 1967 J. A. WRIGHT ET AL 3,318,583
DRINK MIXER ATTACHMENT
Filed June 8, 1966 2 Sheets-Sheet 1
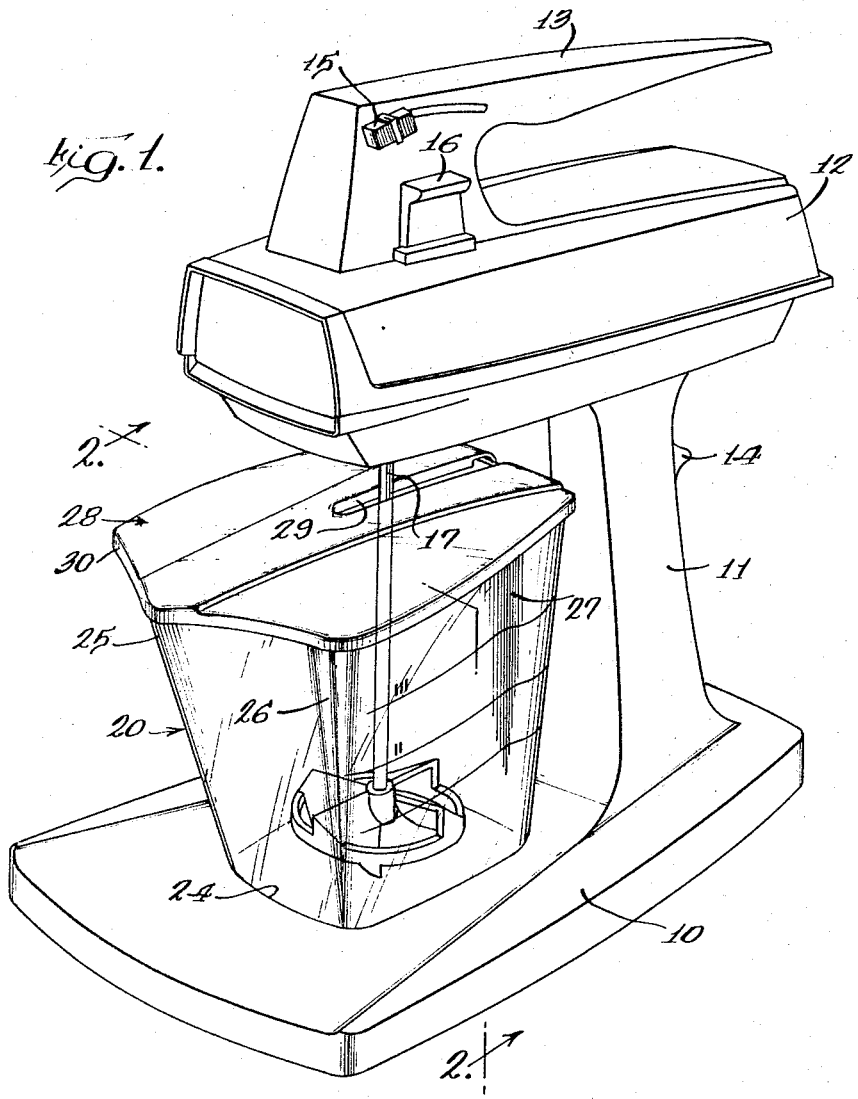
Inventors:
James A. Wright
Worthy L. Chambers
By Walter Lewis
Atty May 9, 1967
J. A. WRIGHT ET AL
3,318,583
DRINK MIXER ATTACHMENT
Filed June 8, 1966
2 Sheets-Sheet 2
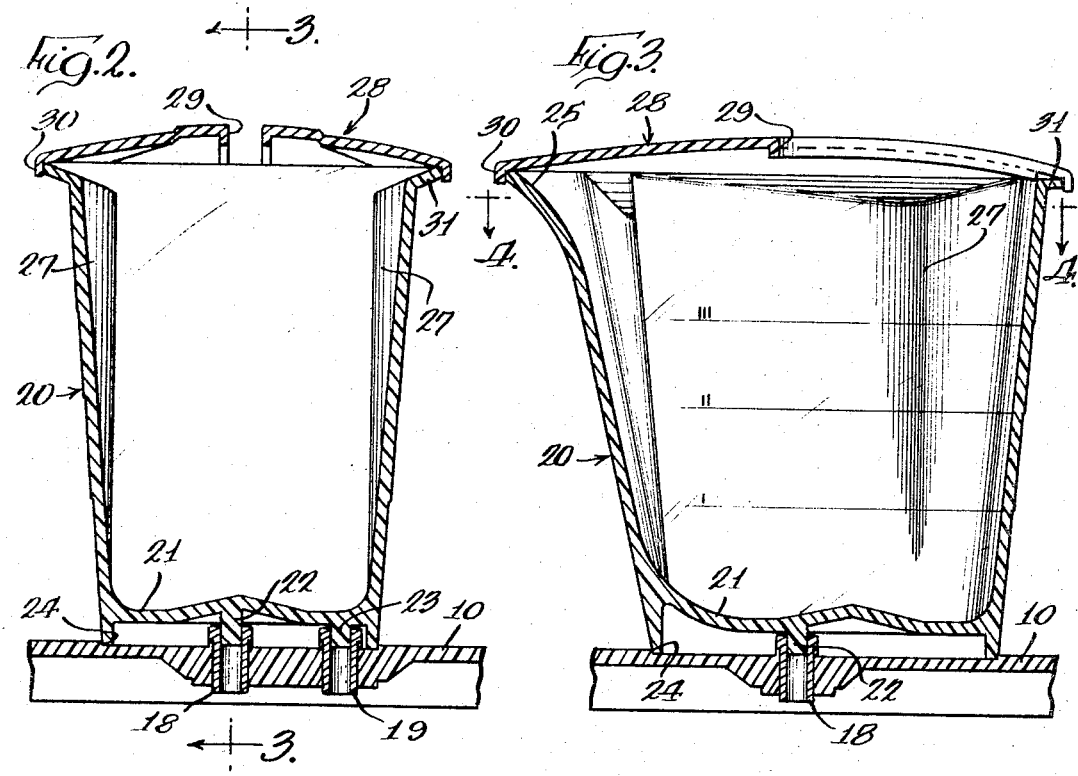
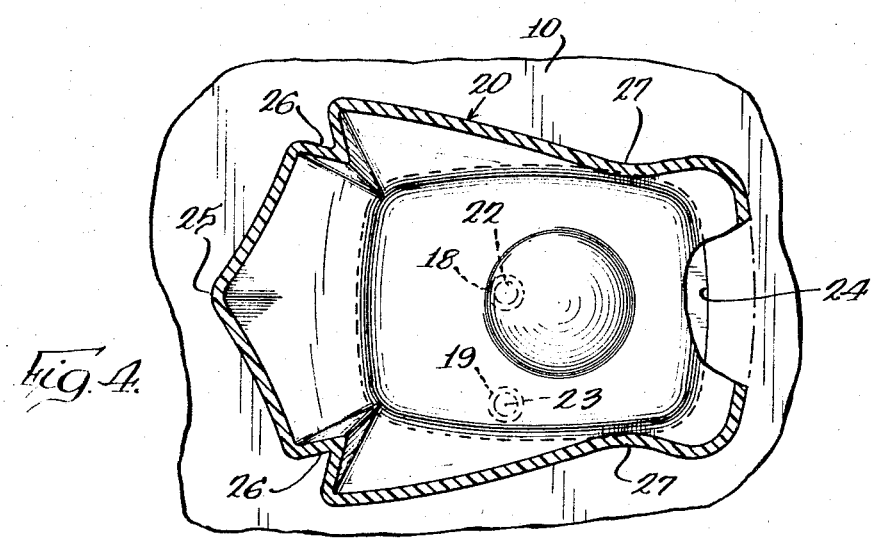
Inventors:
James A. Wright
Worthy L. Chambers
By Walter Lewis
Atty

United States Patent Office 3,318,583
Patented May 9, 1967

3,318,583
DRINK MIXER ATTACHMENT
James A. Wright, Chicago, and Worthy L. Chambers, Lombard, Ill., assignors to Sunbeam Corporation, Chicago, Ill., a corporation of Illinois
Filed June 8, 1966, Ser. No. 556,004
4 Claims. (Cl. 259—108)

This invention relates to a drink mixer attachment, and more particularly, to a drink mixer attachment for a stand mounted mixer.

It is an object of this invention to provide an improved drink mixer attachment for a stand mounted mixer which is low cost and easy to use.

In the preferred form of the invention the drink mixer attachment comprises a jar having a pair of depending bosses formed on its bottom. These bosses are insertable in a pair of bearing collars or sleeves formed on the base of the mixer stand. The bearing collars or sleeves are ordinarily used for purposes of supporting a rotary turntable for mixing bowls for the mixing apparatus. The base of the stand also has a shoulder formed thereon which conforms to the peripheral contour of the jar bottom. This shoulder and the bosses on the jar bottom are nonsymmetrically oriented with respect to each other so that the jar can be positioned in a single correct position on the base of the stand. The jar itself preferably is constructed from clear plastic material and has a generally rectangular horizontal cross-sectional shape. The upper edge of the front of the jar has a pouring lip formed thereon. The two lengthwise extending corners of the front of the jar are indented in an inward direction and are tapered in their downward direction. These two indented corners promote proper mixing of the contents of the jar and neat pouring of the contents of the jar. Adjacent to the rear of the jar a pair of gradually curved and lengthwise extending indentations are formed in opposite sides of the jar. These curved indentations provide a finger grip for the jar and also promote proper mixing of the contents of the jar. When the jar is correctly positioned on the mixer apparatus base the front or pouring lip of the jar faces away from the stand of the mixing apparatus and the rear side thereof faces the stand. A removable cover is provided for the jar. The cover has a slot formed therein along its lengthwise axis. This slot extends from the central portion of the cover in a direction towards the stand and through the peripheral edge of the cover located along the rear side of the jar. This slot is aligned with the shaft of a drink mixing tool which is intended to be drive connected to the mixer so that the drink mixer tool extends through this slot of the jar.

While the specification concludes with claims particularly pointing out and distinctly claiming the subject matter which is regarded as being the invention, it is believed the invention will be better understood from the following description taken in connection with the accompanying drawings in which:

FIG. 1 is a perspective view of a preferred form of the invention;

FIG. 2 is a sectional view taken along the section line 2—2 of FIG. 1;

FIG. 3 is a sectional view taken along the section line 3—3 of FIG. 2; and

FIG. 4 is a sectional view taken along the section line 4—4 of FIG. 3.

Referring now particularly to the drawings, the illustrated form of the invention comprises a stand mounted mixing apparatus having a base 10 and a pedestal or stand 11 mounted at the rear of base 10. A mixer 12 is pivotally mounted at the upper end of the stand 11 in a manner which is well known in the art. Mixer 12 is pivotally mounted on stand 11 adjacent the rear end of mixer 12. Mixer 12 is provided with a handle 13. Actually, mixer 12 is removably mounted on the stand 11 so that the mixer 12 can be used as a hand mixer. The means for removably mounting the mixer 12 on stand 11 comprises a manually operable control button 14. Mixer 12 is provided with a speed control button 15 and a beater ejection button 16. The button 16 is for the purpose of ejecting a pair of not shown mixer beater shafts which are drive connected to the front end of the mixer 12. In FIG. 1 a drink mixer tool 17 is illustrated as being drive connected to the front end of the mixer 12. The tool 17 likewise can be ejected or separated from drive connection with the front end of mixer 12 by operating the button 16. The base 10 has a pair of bearing sleeves or collars 18 and 19 positioned therein. The bearings 18 and 19 are for the purpose of rotatably supporting a not shown turntable on the base 10 beneath the front end of mixer 12. During use of the mixing apparatus the mixer 12 is horizontally disposed. The not shown turntable is intended to support mixing bowls beneath the mixer 12. The turntable is conventionally provided with a depending shaft which is inserted into either of the bearings 18 or 19 to locate the turntable in two different positions. The parts so far described are well known and conventional structure of stand mounted mixing apparatus.

A drink mixer jar 20 is mounted on the base 10. In the preferred form of the invention jar 20 is constructed from a clear or transparent plastic molding compound. The bottom 21 of jar 20 has a pair of depending integral bosses 22 and 23 formed thereon. Boss 22 is receivable by the turntable bearing 18 and boss 23 is receivable by the turntable bearing 19. In addition, base 10 has a shoulder 24 formed thereon which conforms to the peripheral contour of the jar bottom 21. By viewing FIG. 4 it will be seen that the bearings 18 and 19 and the shoulder 24 are nonsymmetrically oriented with respect to each other. This means that there is only a single and correct position of the jar 20 on the base 10.

The jar 20 is generally rectangular shaped in horizontal cross section. The upper end of its front side has a generally V-shaped pouring lip 25 formed thereon. The two front corners 26 of jar 20 are indented in an inward direction. Also, the corner indentations 26 are tapered in their downward directions. These indented corners 26 promote proper mixing of the contents of jar 20. They additionally promote proper flow of the contents of jar 20 to provide neat pouring of the contents of the jar. The front of jar 20 which includes the pouring lip 25 faces in a direction away from the stand 11.

The rear side of the jar 20 faces the stand 11. The two opposite lateral side walls of jar 20 have gradually inwardly curved and lengthwise extending indentations 27 formed therein adjacent the rear wall of the jar. The indentations 27 provide a finger grip for the rear of the jar and also promote proper mixing of the jar contents. The indentations 27 are also tapered in their downward direction.

The top of jar 20 is open and closed by a removable cover 28. The cover 28 is provided with a slot 29. Slot 29 is aligned with the lengthwise axis of cover 28 and extends from the central portion thereof in a direction toward the stand 11. Slot 29 goes completely through the peripheral edge of cover 28 which is positioned adjacent to the rear end of jar 20. This slot 29 is disposed beneath the front end of mixer 12 in alignment with the shaft of the drink mixer tool 17 so that it extends through the slot 29 into the jar 20. By viewing FIG. 1 it will be seen that if the user wants to add foodstuffs to the contents of jar 20 this can be accomplished very easily by removing the cover 28 while all the other parts remain in their illustrated position. The cover 28 of course prevents splattering of the contents of jar 20 when the drink mixer tool 17 is rotated.

As will be obvious to those skilled in the art the drive means at the front of mixer 12 conventionally comprises a pair of now shown hollow drive spindles. When viewed from the front end of the mixer 12, the drink mixer tool 17 is attached to the right hand mixer drive spindle. The jar 20 is disposed on the base 10 off center to the right so that the slot 29 is properly aligned with the shaft of the drink mixer tool 17.

The peripheral edge of the cover 28 is provided with a depending flange 30 and the peripheral edge of the open end of jar 20 is provided with flange portions 31. These flanges 30 and 31 removably connect the cover to the jar 20 inasmuch as when cover 28 and jar 20 are constructed from plastic molding material a limited amount of resiliency is inherent in the flanges 30 and 31. Due to the matching contour of the cover 28 and the upper end of jar 20 the cover 28 also can be positioned on the jar 20 only in a single correct position, which is the position illustrated in the drawings. When it is desired to remove the jar 20 from the mixing apparatus the cover 28 is first withdrawn from the jar 20. Thereafter, the mixer 12 is pivoted in a rearward direction to withdraw the drink mixing tool 17 from within the jar 20. Then the finger grip portions 27 of jar 20 can be grasped with the hand to take the jar 20 off the base 10. The indented portions 26 and 27 cooperate with the drink mixer tool 17 to promote proper flow and agitation of the contents of jar 20 to obtain the desired thorough mixing of the jar contents. In addition, when the jar contents are being emptied the two identations 26 cause the jar contents to be neatly channeled towards the pouring lip 25 so that the contents are neatly and cleanly poured from within the jar 20.

While there has been shown and described a particular embodiment of the invention, it will be obvious to those skilled in the art that changes and modifications may be made without departing from the invention, and therefore, it is intended by the appended claims to cover all such changes and modifications as fall within the true spirit and scope of the invention.

What is claimed as new and desired to be secured by Letters Patent of the United States is:

1. In a stand supported mixer comprising a base, a stand connected to said base, a mixer supported at the upper end of said stand, and two bearing collars positioned in said base for rotatably supporting the shaft of a mixer bowl supporting turntable in two different positions, said mixer being pivotally supported on said stand at its rear end and having means at its front end for drive connecting a pair of mixer beater shafts thereto, said mixer in its mixing position being horizontally disposed with said collars being located beneath said front end; an improved drink mixer attachment for said stand supported mixer, comprising a drink mixer jar, said jar having a pair of bosses formed on the bottom thereof which are adapted to be received by said collars, a shoulder formed on said base, said shoulder conforming to the peripheral contour of the jar bottom, said shoulder being nonsymmetrically oriented with respect to said collars, and a removable cover for said jar, said cover having a slot formed therein, said slot extending from through one of the peripheral edges of said cover towards the center thereof, said slot being located beneath the front end of said mixer in alignment with the shaft of a drink mixer tool which is adapted to be drive connected to the front end of said mixer whereby said drink mixer tool extends through the slot in said cover and into said jar when said jar is positioned on said base.

2. In a stand supported mixer as in claim 1, the further improvement of said jar being constructed from clear plastic molding material, said jar being rectangular in horizontal cross section, a generally V-shaped pouring lip formed at the upper end of one of the side walls of said jar, the corners of said jar along opposite sides of said one side wall being indented inwardly of said jar, the slot in said cover extending from the central portion of said cover in a direction away from said pouring lip towards the side wall of said jar opposite to said one side wall, the two other side walls of said jar having gradually curved inwardly directed indentations formed along the length thereof adjacent to said opposite side wall to provide a finger grip on said jar, and said jar being positioned on said base with said one side wall and its pouring lip facing away from said stand and said opposite side wall facing said stand with the slot in said cover extending from its inner end in a direction toward said stand.

3. A drink mixer jar for use with a stand mounted mixer, said jar having a closed bottom, four side walls, and an open top, a cover for said open top, said jar being generally rectangular-shaped in horizontal cross section, a generally V-shaped pouring lip being formed at the upper end of one of said side walls, said one side wall comprising the front of said jar and the opposite side wall comprising the rear of said jar, the two corners of said jar extending along opposite sides of the front thereof being indented inwardly of said jar and being tapered in their downward direction, a slot formed in said cover, said slot being aligned with the lengthwise axis of said cover and extending from the central portion thereof towards and through the peripheral edge thereof positioned at the rear of said jar, and a gradually inwardly curved and lengthwise extending indentation formed in the other two side walls of said jar adjacent to the rear thereof, said curved indentations being tapered in their downward direction.

4. In a drink mixer jar as in claim 3, wherein means are formed on the bottom of said jar for positioning the same on the base of a stand mounted mixer, said positioning means comprising a pair of downwardly projecting bosses integrally formed on the underside of said bottom, and said bosses being nonsymmetrically oriented with respect to the peripheral contour of said bottom, said jar being constructed from a clear plastic material, and integral flanges formed on the peripheral edges of said cover and the open top of said jar for removably locking said cover on said jar.

References Cited by the Examiner

UNITED STATES PATENTS

| 2,762,613 | 9/1956 | Burton | 259—108 |
| 2,801,545 | 8/1957 | Schottle | 259—108 X |
| 2,804,290 | 8/1957 | Kaufman | 259—135 |
| 2,896,924 | 7/1959 | Jepson | 259—108 |

WALTER A. SCHEEL, *Primary Examiner.*

R. W. JENKINS, *Assistant Examiner.*